RADIOGRAPHIC SYSTEMS AND METHOD

Filed March 31, 1960 2 Sheets-Sheet 1

INVENTORS
THOMAS H. ROGERS
GORDON F. BAVOR
BROR MAGNUSSON
BY
AGENT

RADIOGRAPHIC SYSTEMS AND METHOD

Filed March 31, 1960

2 Sheets-Sheet 2

INVENTORS
THOMAS H. ROGERS
GORDON F. BAVOR
BROR MAGNUSSON
BY
[signature]
AGENT

United States Patent Office 3,103,591
Patented Sept. 10, 1963

3,103,591
RADIOGRAPHIC SYSTEMS AND METHOD

Thomas H. Rogers, New Canaan, Gordon F. Bavor, Norwalk, and Bror Magnusson, Stamford, Conn., assignors to The Machlett Laboratories, Incorporated, Springdale, Conn., a corporation of Connecticut
Filed Mar. 31, 1960, Ser. No. 19,101
8 Claims. (Cl. 250—102)

This invention relates to improved means and method of radiography and has particular reference to a novel radiographic system and method of operating same, and to a novel X-ray generator which may be selectively operated in conventional radiographic systems or cineradiographic systems.

The problem of motion in cineradiography has been partially solved by an X-ray system which provides more precise, shorter-duration X-ray exposures and more X-ray producing power in a fine focus X-ray tube. Such a system is disclosed in U.S. Patent No. 2,879,404, issued March 24, 1959, to the same assignee as the present application, and embodies means whereby an X-ray tube may be operated for ultra-short time intervals of five milliseconds or less at high voltages, so that extremely intense X-ray beams may be formed for extremely short periods of time.

In the aforementioned patent there is described a system comprising a pulse-forming and timing circuit which is provided for generating a control signal in the form of an essentially square voltage pulse which is applied to the control grid of a switching tube, through a pulse transformer, whereupon energy storage capacitors are discharged as a primary source of energy for an X-ray tube, the switching tube being in series with the positive side of the generator circuit to the anode of the X-ray tube. In this system, the X-ray exposure current wave shape is intended to be essentially the same as the square voltage pulse which is applied to the switching tube so that the exposure duration may be controlled by the adjustment of the initial pulse formed by the pulse-forming and timing circuit.

However, in the above-mentioned and other systems which require that a square voltage pulse be used for a particular purpose, it has been found that certain conditions may exist which will distort the shape of the voltage pulse so that the pulse will not consistently possess the desired "square" shape. For instance, inherent capacitance in a high tension cable between a switching tube and an X-ray tube may provide the pulse with a sloping trailing edge. In such a case, after a voltage pulse has been switched off, the cable will discharge through the X-ray tube, thus effectively stretching out the X-ray current pulse duration.

The present invention embodies a switching circuit wherein the separate switching tube is eliminated and switching of the X-ray tube is accomplished by means of switching means built into the X-ray tube, thus eliminating the need for a high tension cable between the switching means and X-ray tube and insuring precise control of the X-ray current pulse duration at all times. The X-ray tube receives current directly from a high voltage generator, such as a four-valve full-wave bridge rectifier type, or from energy storage capacitors which are energized by the power line in advance of making an exposure with the X-ray tube.

Accordingly, it is a primary object of the present invention to provide an improved radiographic system wherein an X-ray tube is operable for precise, accurately controlled duration exposure cycles.

Another object is the provision of a system of the above character wherein pulse-forming means is utilized to provide an initial square pulse of desired time characteristics, which pulse is transmitted to switching means within the X-ray tube, and wherein the X-ray tube is accurately and efficiently operated for an exposure cycle of a duration precisely controlled by the time characteristics of the pulse initially formed by the pulse-forming means.

Another object is to provide a radiographic system wherein an X-ray tube is operated in response to a signal transmitted through a cable from a separate signal source and wherein the effect of cable capacitance upon the length of the exposure cycles of the X-ray tube is negligible.

Another object is to provide a novel X-ray tube having novel built-in switching means and a filament associated therewith, the switching means enabling the tube to be used in cineradiographic systems wherein the emission from the associated filament is activated, under control of the switching means, to produce a small focal spot of precisely controlled dimensions required in such cineradiographic systems, and having a second filament disassociated from the switching means and selectively operable to produce a large focal spot suitable for conventional radiography.

Other objects and advantages of the invention will become apparent from the following description taken in connection with the accompanying drawings, wherein:

FIGS. 8 and 9 are schematic control circuits for selection of the desired filament in the X-ray tube.

Figure 1:
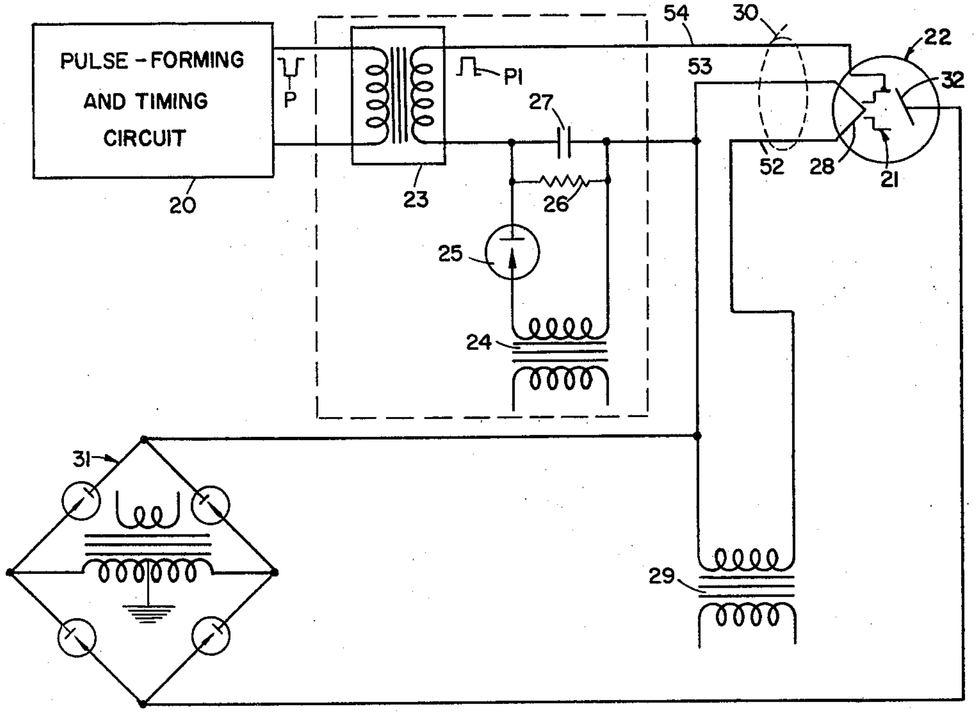
FIG. 1 is a simplified schematic diagram of the circuit of the switching system.

Referring more particularly to FIG. 1, there is shown a pulse-forming and timing circuit 20 for generating a control signal in the form of an essentially square voltage pulse P which is applied to switching means 21 in an X-ray tube 22 through a pulse transformer 23. The pulse-forming and timing circuit 20 may be any suitable circuit which produces essentially square pulse signals and which allows adjustment of the pulse width within a suitable range, such a circuit being disclosed in aforementioned Patent No. 2,879,404.

The pulse transformer 23 transmits square pulses of controlled width, such as about 5 milliseconds or less, for example, without appreciable distortion and also serves to isolate the control circuitry from the high tension part of the system. The primary of the transformer is connected directly into the circuit 20.

A negative bias is applied to the switching means 21 in the X-ray tube 22, through the secondary of pulse transformer 23, by means such as a power supply consisting of a transformer 24, rectifier 25, resistor 26 and filter capacitor 27. This power supply serves to maintain the switching means normally at a negative potential of, for example, 1500 volts with respect to the potential of the filament 28 of X-ray tube 22.

Filament 28 is fed by a transformer 29, through suitable leads 56 and 57 which, with the lead 58 to the switching means 21, may be combined in one conventional three-wire cable 30.

A high voltage generator 31, such as the four-valve full-wave bridge rectifier type illustrated in FIG. 1, is utilized to supply power for energizing the X-ray tube 22, one side of the generator 31 being connected directly to the filament 28 and the other side directly to the anode 32.

When pulse P is formed by the pulse-forming and timing circuit 20, it will be transmitted as a voltage pulse P1 by the transformer 23 directly to the switching means 21 in X-ray tube 22, overriding the negative bias by an amount sufficient to allow the tube to conduct and thus to generate X-radiation.

The duration of the period of X-ray generation is controlled by the width of the pulse formed by circuit 20, and at the termination of the pulse the negative bias on switching means 21 recovers, thus terminating the generation of X-rays. The width of the pulses are adjusted so that the resultant exposure cycles are limited to precisely timed durations in a selected range such as, for example, from one to five milliseconds. The pulses are synchronized with the sine wave of the voltage from the generator or, if this is undesirable, energy storage capacitors may be used in the same manner as described in the aforementioned patent.

Figure 2:
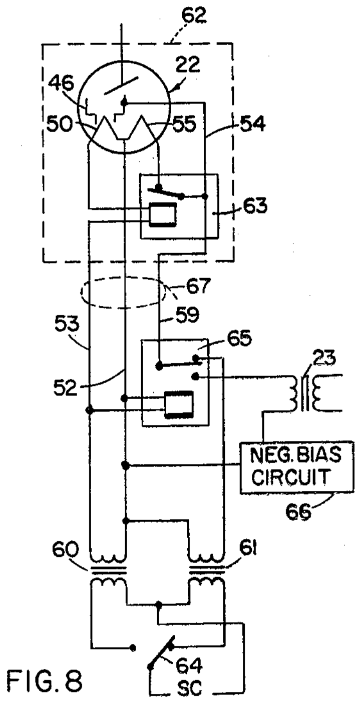
FIG. 2 shows substantially the shape of a voltage pulse applied to an X-ray tube according to the prior art.
Figure 2:
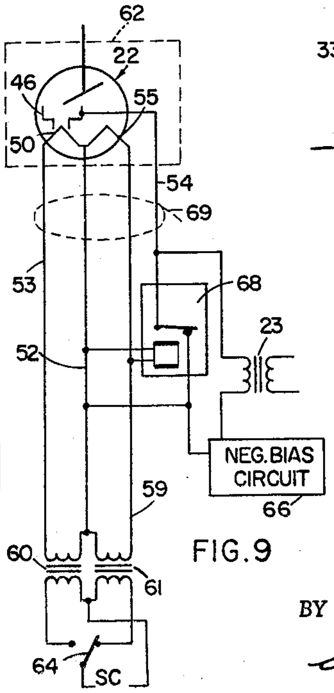
Figure 2:
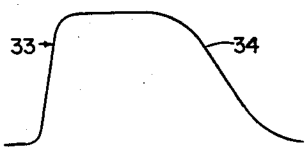

The shape of a voltage pulse formed by prior art systems which utilized lengthy cables joining the switching tube to the X-ray tube could not be consistently precisely controlled because of the fact that inherent capacitance in the cable sometimes prevented sharp cutoff of the X-ray tube. A voltage pulse thus formed assumed substantially the shape shown in FIG. 2 wherein it will be noted that pulse 33 has a sloping trailing edge 34.

Figure 3:
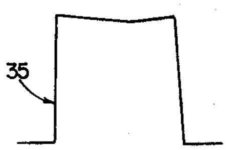
FIG. 3 shows substantially the shape of a current pulse passing through the X-ray tube of the present invention.

By incorporating the switching means 21 directly in the X-ray tube 22, instead of in a separate switching tube joined by a cable to the X-ray tube, this undesirable effect of cable capacitance is eliminated. A current pulse thus passes through the X-ray tube, which pulse consistently has an essentially square shape corresponding to that produced by the pulse-forming and timing circuit 20, as illustrated by pulse 35 in FIG. 3.

The switching means 21 in the X-ray tube 22 preferably comprises an electric field forming elment which encircles the filament and which, when the negative bias is applied, creates the desired negative field which prevents flow of electrons from the filament 28 to anode 32. It is desirable also, in accordance with this invention, that the field forming element be shaped to focus the electrons emitted by the filament, when the negative bias is removed or overcome, so that a proper focal spot is formed at the anode. This dual purpose can best be achieved, we have found, by the provision of a "three step" element, to be described more fully hereinafter.

Although so-called "three step" focusing cups or electrodes are known, it has not been known that by precise control of the geometry of such a cup, together with control of the electrical characteristics of the system, the cup also may be used as a switching element which will function to cut off or prevent flow of electrons between cathode and anode by application of relatively low negative bias.

Desirable characteristics in a tube suitable for cineradiography include a maximum X-ray tube voltage of about 150 kv., maximum peak tube current of about 100 ma., and individual frame exposures, or "pulse" durations, ranging from about .5 to 5 milliseconds.

Another requirement is that the switching means completely cut off electron flow with a manageable value of negative voltage and allow full emission current when the negative potential is removed, such full emission current to be determined by the filament temperature as in conventional X-ray tubes rather than by a "driving" voltage of an electrode adjacent the filament. Therefore, the switching means is at cathode potential or at some fixed potential near cathode potential during an exposure period.

It is also essential that the electron beam be focused to a relatively small focal spot for efficient cineradiography, and to accomplish this the switching means is combined with a focusing cup which, we have found, can be so designed as to provide the desired small focal spot while still permitting low negative voltage cutoff with the desired range of tube voltages. We have found that at the maximum desired tube voltage of 150 kv., cutoff can be accomplished by application to the switching means of only about −1.5 kv. At about 100 kv. tube voltage, cutoff voltage is about −1 kv.

We have found that the geometry of the combined switching means and focusing cup requires that a compromise be made between maximum anode current and minimum cutoff voltage, but this is less of a problem if the peak anode current required is relatively small and if the focal spot is smaller than usual. Optimization of the shape and dimensional details of the structure resulted in a set of characteristics which are surprisingly consistent with the requirements described above.

Although the cathode of the present invention may embody a single filament enabling the X-ray tube to be used in the system shown in FIG. 1, in accordance with this invention we have provided a novel X-ray tube which may be used to perform in the cine system described or in conventional radiography, particularly "spot film" radiography.

Most spot film techniques require X-ray tube currents as high as 300 to 500 ma., and to provide loading capacity at this level would necessitate a considerably larger focal spot than is required for cineradiography. Hence, in addition to a desired small focus cathode with built-in switching means for cine applications we have provided in the same tube a second cathode, without switching means, to produce a larger focal spot for conventional high-current radiography.

Figure 4:
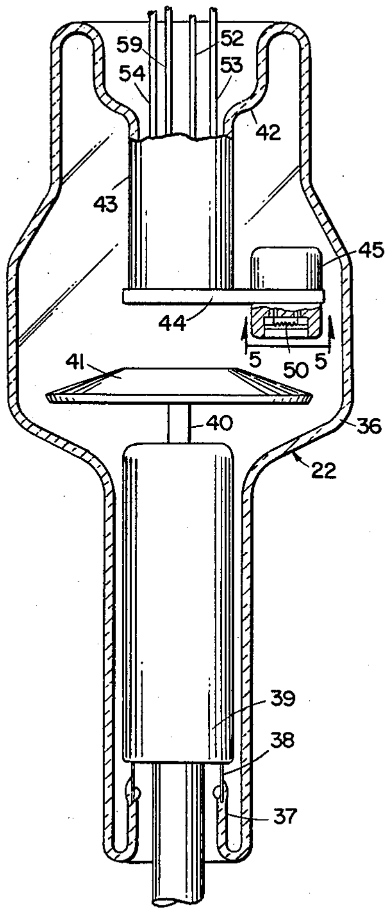
FIG. 4 is a view partly in axial section of an X-ray tube embodying the present invention.

Such a novel X-ray tube 22 is shown more clearly in FIG. 4 and comprises an envelope 36, one end of which has a reentrant portion 37 which is sealed by a metal collar 38 to an anode-supporting structure 39. Supporting structure 39 carries a rotatable shaft 40 on the inner end of which is located a tungsten target 41.

The opposite end of the envelope 36 has a reentrant portion 42 which is sealed to the cathode supporting structure 43 by any suitable method. The inner end of the cathode supporting structure 43 is provided with a transverse supporting member 44 which carries at its outer end a cathode head 45.

Figure 5:
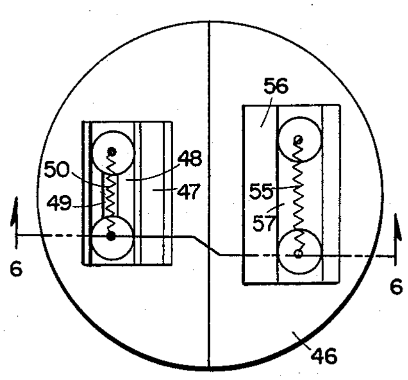
FIG. 5 is an enlarged elevational view of the cathode head taken on line 5—5 of FIG. 4 looking in the direction of the arrows.
Figure 6:
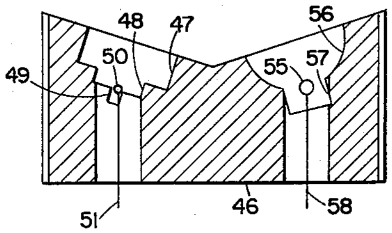
FIG. 6 is a vertical sectional view of the cathode head taken substantially on line 6—6 of FIG. 5.

Cathode head 45 is shown in detail in FIGS. 5 and 6 and comprises a metal block 46 having a substantially V-shaped surface directed toward the target 41. In one of the inclined faces of said surface there is provided a triple-step cup or recess comprising a first rectangular slot 47. Another slot 48 is provided in the bottom of slot 47 and itself has a third slot 49 in its bottom. Slots 47, 48 and 49 all extend parallel with one another for a desired distance and may extend throughout the length of the block. Located adjacent the mouth of the inner slot 49 is a filament 50 which extends longitudinally of the slot for a selected relatively short distance substantially parallel with the plane of the bottom of the slot 48. The ends 51 of the filament extend through the block 46 in insulated relation thereto and are connected by suitable means to leads 52 and 53 (FIG. 4) which extend outwardly of the tube through the cathode-supporting structure 43 and which are connected to the filament power supply 29 shown in FIG. 1.

Another lead 54, which also extends outwardly of the tube through structure 43, is connected directly to the cathode block 46 by means to be described hereinafter. The block 46 with the slots 47—48—49 therein comprises the switching means which is indicated in FIG. 1 by numeral 21 and which is connected by lead 54 to the pulse transformer 23.

In operation of the tube, a selected voltage is applied between the filament and anode and a negative bias is applied through lead 54 to the block or switching means as described hereinbefore, to prevent flow of electrons from the filament to the anode. Then when a pulse is formed by the pulse-forming and timing circuit 20, this pulse will be transmitted by pulse transformer 23 through lead 54 to the block 46. This will remove the negative bias, whereupon the block will assume substantially the potential of the filament 50. In this way electrons will be permitted to flow from the filament 50 to the target 41 for the generation of X-radiation which passes from target 41 outwardly of the tube through the envelope 36. Upon termination of the pulse, the negative bias will be automatically and quickly restored, and flow of electrons and consequent generation of X-rays will be sharply terminated.

The structure described above provides a relatively small and uniform focal spot such as is desirable for cineradiography. Moreover, we have obtained such a focal spot with a focusing structure which permits operation of the X-ray tube at the restricted cutoff voltage and current levels mentioned above. In establishing the geometry capable of accomplishing such operation, we found that the known conventional three-step focusing cups were unsuitable and required a carefully worked out modification, as will be described in connection with FIG. 7, in order to produce the desired results.

The best control of electron flow is achieved when the anode potential field extends to the filament but not substantially into the slot behind the filament. To facilitate this condition, the innermost slot 49 is made extremely narrow, in fact, as narrow as possible but compatible with non-shorting of the filament when the filament is expanded by heat under operating conditions. Although such a narrow slot prevents electrons emitted into the slot from moving in the direction of the anode, it was found that at the selected tube-operating levels sufficient quantities of electrons are emitted from the front and effective side areas of the filament.

We have found that with a focusing cup having three steps of substantially equal depth, a desired small focal spot of about .5 mm. width, for example, cannot be readily obtained even by adjustment of the filament with respect to slot 49.

The focal spot size is governed by the dimensions of the slots, and the same size spot can be achieved by several variations of these dimensions. However, changing from one combination of dimensions to another may either desirably or undesirably change other characteristics of the X-ray tube even though the size of the focal spot remains unchanged. For example, a cup with one combination of dimensions may require a lower negative cutoff voltage than is required with a cup having a different combination of dimensions.

As a general rule, it is indicated when comparing different dimensional combinations producing the same focal spot size, that the combination where the filament is recessed the greatest distance into the body of the cathode requires lower negative cutoff voltage but it also results in lower available anode current, other factors remaining unchanged. Thus, a compromise must be made as pointed out above.

Figure 7:
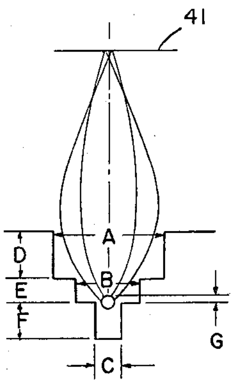
FIG. 7 is a schematic illustration of the geometry of the cathode structure in the vicinity of the filament used in forming small focal spots.

One example of a satisfactory construction is shown in FIG. 7 wherein at a tube voltage of about 150 kv. cutoff can be accomplished at about −1.5 kv., or wherein at about 100 kv. tube voltage the cutoff voltage is about −1 kv. In this example the following dimensions will achieve a focal spot 0.5 mm. wide when the cup is at the required distance from the anode:

| | |
|---|---|
| Filament coil diameter | .033″ |
| A | .343″ |
| B | .185″ |
| C | .046″ |
| D | .137″ |
| E | .052″ |
| F | .067″ |
| G | .015″ |

Exposures are made when the block 46 is at a potential substantially the same as the potential of the filament, this occurring when the pulse-forming circuit functions as described hereinbefore. At the termination of each exposure cycle, the block 46 becomes a switching device to cut off flow of electrons in the tube. This is accomplished by automatically applying a negative bias potential to the block 46 as set forth above.

The presently described tube is a dual purpose tube, as pointed out earlier, and can also perform efficiently in conventional spot film radiographic systems wherein a larger focal spot is usable. For this latter purpose the cathode head is provided with a second filment 55 which is located in a rounded slot 56 formed in the other of the inclined surfaces of the block 46. Slot 56 extends substantially parallel with slot 47 and has in its lowermost region a longitudinally extending flat-sided slot 57. The filament 55 is preferably located in or adjacent to a plane defined by the junction between slots 56 and 57 and extends parallel therewith. The ends 58 of filament 55 extend through and are insulated from the block, one end being connected to a lead 59 extending outwardly of the tube through structure 43 similar to leads 52, 53 and 54, while the other end is connected to lead 52, so that lead 52 is common to both filaments 50 and 55.

The system described earlier in connection with FIG. 1 is readily adaptable to the dual-filament tube with the addition of means for selectively connecting one or the other of the filaments into the system whereby the tube may be used to produce the small focal spot for cineradiographic use or the larger focal spot for use in conventional radiography.

Such means may embody either of two auxiliary circuits, and the system readily accepts either. While it is probably desirable to retain the standard three-wire cable for feeding supply voltages to the X-ray tube, it is apparent that if only three conductors are to be employed the means for supplying voltage to the switching means in the X-ray tube must be incorporated as an auxiliary package in the X-ray tube head. We have provided, in further accordance with this invention, two arrangements which minimize or eliminate this disadvantage. Either arrangement involves a small auxiliary unit which is connected between the generator 31 and X-ray tube 22 by acting as a junction box in one of the conductors. One arrangement, shown schematically in FIG. 8, retains the three-wire standard cable and involves the inclusion of a small appendage to the X-ray tube head to enclose a relay. The other arrangement shown in FIG. 9 involves no additional elements in the tube head but requires the use of a four-wire cable between the auxiliary unit and the X-ray tube.

Referring to FIG. 8, each filament 50 and 55 is connected with a respective filament transformer 60—61 through the aforementioned leads or conductors 52, 53 and 59. The X-ray tube head is indicated by dotted line 62 and shows that the lead 54 from the switching means 46 is connected within the head 62 to filament lead 59 through a relay 63. The filament transformers 60—61 are adapted to be selectively connected to a source of current through a manually operable switch 64. Lead 59 is connected to one side of the pulse transformer 23 through a relay 65, the other side of the transformer being connected to the negative bias circuit which is indicated in FIGS. 8 and 9 by box 66.

In FIG. 8 the circuit is closed to filament 55. Thus, the device is in condition for conventional radiography. When switch 64 is reversed, current is supplied to filament 50. This operates relay 63 to disconnect filament 55, and also operates relay 65 to connect the pulse transformer 23 into the now active portion of the circuit. The negative bias from circuit 66 is thus supplied to switching means 46 to prevent operation of the X-ray tube 22. However, a positive-going pulse from transformer 23 will change the potential of the switching means 46 to zero potential or substantially the potential of the filament, thus allowing the X-ray tube to operate as described hereinbefore.

It will be noted that in this case a three-wire cable is used as indicated at 67.

In the four-cable circuit of FIG. 9, the large focus filament 55 is likewise shown activated through leads 52—59 and filament transformer 61. The lead 54 to switching means 46 extends as a fourth conductor in four-wire cable 69 outwardly from X-ray tube 22 and head 62 and is connected directly to one side of pulse transformer 23 which is connected at its other side to the negative bias circuit 66. A relay 68 functions when filament 55 is energized to short circuit the pulse transformer 23 and negative bias circuit 66. However, operation of switch 64 deenergizes filament 55, energizes filament 50, and opens relay 68. This places the negative bias potential on the switching means 46 until this potential is overcome by a positive going pulse from transformer 23, as described before.

From the foregoing it will be apparent that we have provided novel and efficient cineradiograph apparatus which also may be used for conventional radiographic purposes, in accordance with the objects of this invention. It is to be understood that certain modifications may be made within the scope of the appended claims without departing from the spirit of the invention as expressed therein.

We claim:

1. A system for selectively producing conventional radiographic exposures utilizing relatively large focal spots produced at the anode of an X-ray tube and cineradiographic exposures utilizing relatively small focal spots produced in the same tube, comprising a first filament and a second filament mounted in spaced relation in said tube, switching means in the X-ray tube comprising a conductive field-forming element within which the filaments are recessed, power supply means for the filaments, means for supplying a negative bias potential to the switching means for creating a negative field at said first filament for suppressing electron flow therefrom, means for producing a voltage pulse having a potential sufficient to overcome the negative potential on the switching means and for transmitting such a square pulse to the switching means to overcome said negative potential whereby the first filament is permitted to give off a stream of electrons and control means connected with said power supply means for the filaments for simultaneously disconnecting said first filament from the power supply means, removing potential from said switching means, and connecting the second filament to the power supply means, said control means comprising a first conductor connecting one side of each of the filaments to said power supply means, a second conductor connecting the power supply means to the other side of the first filament, a third conductor connected at one end to the power supply means and at its other end to a contact in a first relay which is connected across the first and second conductors, the armature of said relay being connected by a lead to the switching means, a second relay in said second conductor and having an armature connected to said lead and having a contact connected by a lead to the second filament, the negative bias circuit being connected between a second contact in said first relay and said first conductor, and a switch connected to the power supply means for selectively connecting the power supply means to the first and second conductors and to the first and third conductors.

2. A system for selectively producing conventional radiographic exposures utilizing relatively large focal spots produced at the anode of an X-ray tube and cineradiographic exposures utilizing relatively small focal spots produced in the same tube, comprising a first filament and a second filament mounted in spaced relation in said tube, switching means in the X-ray tube comprising a conductive field-forming element within which the filaments are recessed, power supply means for the filaments, means for supplying a negative potential to said switching means for suppressing electron flow from said first filament, pulse-forming and timing means connected with the switching means and adapted to produce a square pulse having a time constant controlled in accordance with the selected duration of an exposure of the X-ray tube and having a potential which is sufficient to overcome the negative potential on the switching means, means for transmitting from the pulse-forming means to the switching means such a square pulse to overcome the negative potential on the switching means for a time interval precisely controlled by the time constant of the pulse whereby the first filament is permitted to give off a stream of electrons for a precise length of time corresponding to the time constant of the pulse as produced by the pulse-forming and timing circuit, one side of the pulse-forming and timing means being connected through a pulse transformer to the switching means and the other side being connected to said first filament, said means for supplying a negative potential to the switching means being connected in the circuit between the X-ray tube and the pulse-forming and timing means, said switching means having controlled geometric characteristics such that the electron stream is focused to a relatively small focal spot of predetermined shape and size, and control means connected with said power supply means for the filaments for simultaneously disconnecting said first filament from the power supply means, removing potential from said switching means, and connecting the second filament to the power supply means, said control means comprising a first conductor connecting one side of each of the filaments to said power supply means, a second conductor connecting the power supply means to the other side of the first filament, a third conductor connected at one end to the power supply means and at its other end to a contact in a first relay which is connected across the first and second conductors, the armature of said relay being connected by a lead to the switching means, a second relay in said second conductor and having an armature connected to said lead and having a contact connected by a lead to the second filament, the negative bias circuit being connected between a second contact in said first relay and said first conductor, and a switch connected to the power supply means for selectively connecting the power supply means to the first and second conductors and to the first and third conductors.

3. A system for selectively producing conventional radiographic exposures utilizing relatively large focal spots produced at the anode of an X-ray tube and cineradiographic exposures utilizing relatively small focal spots produced in the same tube, comprising a first filament and a second filament mounted in spaced relation in said tube, switching means in the X-ray tube comprising a conductive field-forming element within which the filaments are recessed, power supply means for the filaments, means for supplying a negative potential to the switching means for creating a negative field at said first filament for suppressing electron flow therefrom, means for producing a voltage pulse having a potential sufficient to overcome the negative potential on the switching means and for transmitting such a pulse to the switching means to overcome said negative potential whereby the first filament is permitted to give off a stream of electrons, and control means connected with said power supply means for the filaments for simultaneously disconnecting said first filament from the power supply means, removing potential from said switching means, and connecting the second filament to the power supply means, said control means comprising a first conductor connecting one side of each of the filaments to said power supply means, a second conductor connecting the power supply means to the other side of the first filament, a third conductor connecting the power supply means to the other side of the second filament, a relay connected across the first and third conductors and having an armature and a contact, a fourth conductor connecting the armature to the switching means, the negative bias circuit being connected between the first and fourth conductors and to said contact, and a switch connected to the power supply means for selectively connecting the power supply means to the first and second conductors and to the first and third conductors.

4. A system for selectively producing conventional radiographic exposures utilizing relatively large focal spots produced at the anode of an X-ray tube and cineradiographic exposures utilizing relatively small focal spots produced in the same tube, comprising a first filament and a second filament mounted in spaced relation in said tube, switching means in the X-ray tube comprising a conductive field-forming element within which the filaments are recessed, power supply means for the filaments, means for supplying a negative potential to said switching means for suppressing electron flow from said first filament, pulse-forming and timing means connected with the switching means and adapted to produce a square pulse having a time constant controlled in accordance with the selected duration of an exposure of the X-ray tube and having a potential which is sufficient to overcome the negative potential on the switching means for a time interval precisely controlled by the time constant of the pulse whereby the first filament is permitted to give off a stream of electrons for a precise length of time corresponding to the time constant of the pulse as produced by the pulse-forming and time circuit, one side of the pulse-forming and timing means being connected through a pulse transformer to the switching means and the other side being connected to said first filament, said means for supplying a negative potential to the switching means being connected in the circuit between the X-ray tube and the pulse-forming and timing means, said switching means having controlled geometric characteristics such that the electron stream is focused to a relatively small focal spot of predetermined shape and size, and control means connected with said power supply means for the filaments for simultaneously disconnecting said first filament from the power supply means, removing potential from said switching means, and connecting the second filament to the power supply means, said control means comprising a first conductor connecting one side of each of the filaments to said power supply means, a second conductor connecting the power supply means to the other side of the first filament, a third conductor connecting the power supply means to the other side of the second filament, a relay connected across the first and third conductors and having an armature and a contact, a fourth conductor connecting the armature to the switching means, the negative bias circuit being connected between the first and fourth conductors and to said contact, and a switch connected to the power supply means for selectively connecting the power supply means to the first and second conductors and to the first and third conductors.

5. A system substantially as set forth in claim 1 wherein the X-ray tube and second relay are mounted in a head, and the parts in the head are connected to elements of the circuitry external of the head by a three-wire cable comprising said first and second conductors and said lead.

6. A system substantially as set forth in claim 3 wherein the X-ray tube is mounted in a head and the parts thereof are connected to elements of the circuitry external of the head by a four-wire cable comprising said first, second, third and fourth conductors.

7. An X-ray tube comprising an evacuated envelope containing spaced anode and cathode structures, and a plurality of leads extending exteriorly of the envelope, the cathode structure embodying a conductive metal block having an uncovered recess in its surface nearest the anode structure, a pair of spaced openings through the block and communicating with the lower portions of the recess, a filament in the recess having conductors extending from the ends thereof through respective openings and respectively connected to two of said leads, the recess having the shape of three straight-sided slots one of which is in the surface nearest the cathode structure, the second of which is in the bottom of the first slot, and the third of which is in the bottom of the second slot, the filament being located adjacent the mouth of the third slot, and means connecting the block with a third lead whereby potential may be applied to the block independently of the filament.

8. An X-ray tube substantially as set forth in claim 7 wherein the filament is a coil approximately .033″ in diameter, the width of the first slot is approximately .343″, the width of the second slot is approximately .185″, the width of the third slot is approximately .046″, the depth of the first slot is approximately .137″, the depth of the second slot is approximately .052″, the depth of the third slot is approximately .067″, and the surface of the filament nearest the anode structure is located in the second slot approximately .015″ from the bottom thereof.

References Cited in the file of this patent

UNITED STATES PATENTS

| | | |
|---|---|---|
| 1,956,396 | Moran | Apr. 24, 1934 |
| 2,036,069 | Morrison | Mar. 31, 1936 |
| 2,392,380 | Varian | Jan. 8, 1946 |
| 2,691,735 | Boldingh | Oct. 12, 1954 |
| 2,836,757 | Atlee | May 27, 1958 |
| 2,862,107 | Cummings | Nov. 25, 1958 |
| 2,921,214 | Broad | Jan. 12, 1960 |

FOREIGN PATENTS

| | | |
|---|---|---|
| 651,455 | Great Britain | Apr. 4, 1951 |